United States Patent [19]
Dommett et al.

[11] Patent Number: 5,325,949
[45] Date of Patent: Jul. 5, 1994

[54] BRAKE OR CLUTCH UNIT WEAR ADJUSTMENT MEANS

[75] Inventors: Simon P. Dommett, Wootton; Peter R. Davies, Brogborough; Ian N. Hakon, Bedford, all of England

[73] Assignee: TI Interlock Limited, Bedford, England

[21] Appl. No.: 135,376

[22] Filed: Oct. 12, 1993

Related U.S. Application Data

[63] Continuation of Ser. No. 920,218, Jul. 24, 1992, abandoned.

[30] Foreign Application Priority Data

Jul. 25, 1991 [GB] United Kingdom ............... 9116107

[51] Int. Cl.⁵ .................... F16D 13/75; F16D 65/72
[52] U.S. Cl. .................. 192/70.25; 192/85 AA; 192/111 A; 188/71.8; 188/196 A
[58] Field of Search .......... 192/70.25, 111 A, 85 AA; 188/71.8, 196 A

[56] References Cited

U.S. PATENT DOCUMENTS

| | | | |
|---|---|---|---|
| 2,386,220 | 10/1945 | Lawler et al. | 192/85 AA X |
| 3,243,026 | 3/1966 | Snoy et al. | 192/111 A X |
| 3,245,507 | 4/1966 | Hilpert | 192/111 A X |
| 3,255,846 | 6/1966 | Livezey | 192/111 A X |
| 3,262,531 | 7/1966 | Black et al. | 192/111 A X |
| 3,995,721 | 12/1976 | Chambers | 188/71.8 |

FOREIGN PATENT DOCUMENTS

| | | |
|---|---|---|
| 0092896 | 11/1983 | European Pat. Off. . |
| 1222635 | 2/1971 | United Kingdom . |
| 1279706 | 6/1972 | United Kingdom . |
| 1309217 | 3/1973 | United Kingdom . |
| 1457016 | 12/1976 | United Kingdom . |
| 2065250 | 6/1981 | United Kingdom . |

*Primary Examiner*—Richard M. Lorence
*Attorney, Agent, or Firm*—Seidel, Gonda, Lavorgna & Moraco

[57] ABSTRACT

A clutch or brake unit is described with an automatic wear adjustment mechanism.

Clutches and brakes operate by the engagement of friction members (4,6) which experience wear in use requiring a larger stroke of the unit to effect engagement. This results in delayed clutch or brake operation which can be a serious disadvantage where prompt action is required. Conventionally this wear has been compensated by replacement of the worn friction members or by manual adjustment of them resulting in temporary disablement of the unit and requiring service personnel time.

In the inventive unit, friction members (4,6) are mounted between pressure members (10,2) and an actuator (12) operates against a backing member (15) to effect clutch or brake actuation and de-activation by movement of the friction members towards and away from each other, and the position of at least one of the pressure members is adjusted automatically in response to wear of the friction members. Sprags, ratchet mechanisms, screw threads and tension springs are alternatively described for adjusting this position and the wear can be sensed by a proximity switch or microswitch. Pneumatic and hydraulic mechanisms are also described.

5 Claims, 5 Drawing Sheets

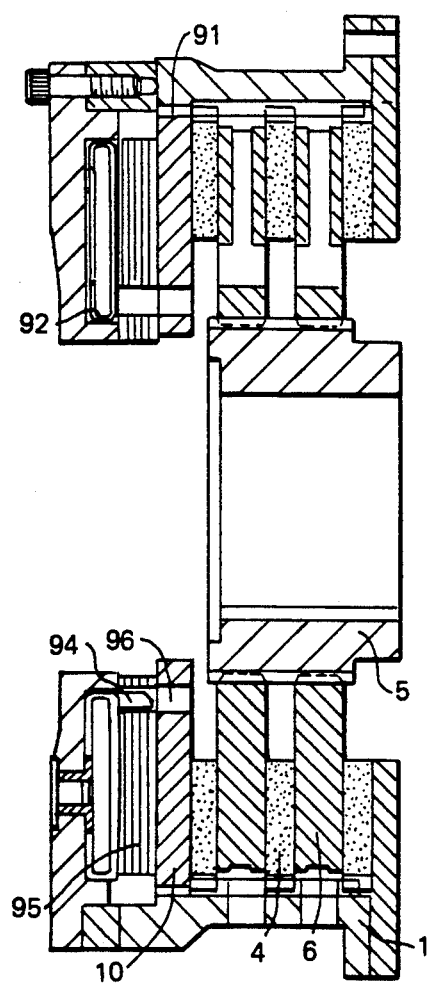
FIG. 8A
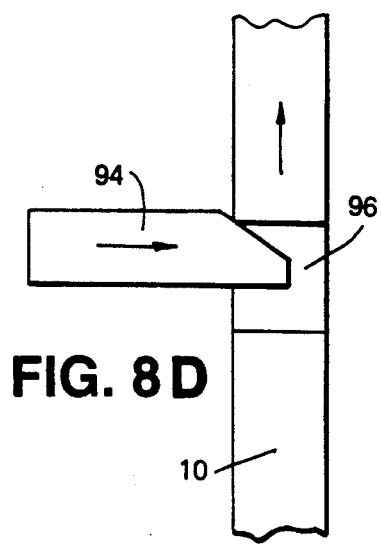
FIG. 8D
FIG. 8C
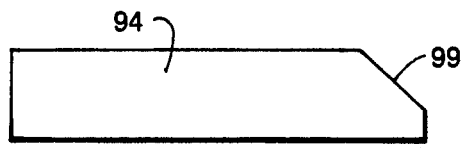
FIG. 8B
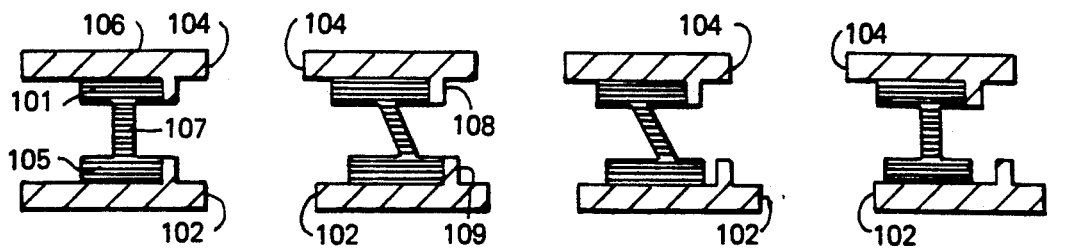
FIG. 9A  FIG. 9B  FIG. 9C  FIG. 9D

BRAKE OR CLUTCH UNIT WEAR ADJUSTMENT MEANS

This is a continuation of co-pending application Ser. No. 07/920,218 filed on Jul. 24, 1992, now abandoned.

FIELD OF THE INVENTION

The invention relates to a brake or clutch unit with wear adjustment means.

BACKGROUND TO THE INVENTION

Typical of the brake or clutch units with which the invention is concerned are units in which engagement is effected between one or more metal brake discs and one or more discs of friction material of a disc pack, by axial movement, to effect a braking action between members carrying the respective discs, or to couple them rotationally together. In such units, the or each disc of frictional material in particular experiences considerable wear and the axial movement needed to effect braking or clutch engagement correspondingly increases progressively, as the wear increases. Brake or clutch operation is consequently delayed and this can be a serious disadvantage where prompt application is required. Such wear can be accommodated by replacement of the friction discs, or by manual adjustment of the components of the unit. In either event, the time of service personnel is employed and the unit is out of use for a substantial period.

The present invention accordingly has as an object the provision of a brake or clutch unit in which disc pack wear is compensated for automatically, that is, in response to its occurrence.

SUMMARY OF THE INVENTION

According to the present invention there is provided a clutch or brake unit comprising: a plurality of friction members, first and second pressure members, means mounting said plurality of friction members between said first and second pressure members, means mounting said first and second pressure members for relative movement towards and away from each other to effect clutch or brake actuation and deactuation respectively by engagement and disengagement of said plurality of friction members, drive means for relatively moving said first and second pressure members, and means responsive to wear of said plurality of friction members to adjust the position of at least one of said pressure members relative to said plurality of friction members to accommodate said wear.

Thus a clutch or brake unit according to the invention may have a drive assembly for effecting relative axial movement of a brake or clutch disc pack to effect engagement or disengagement thereof, in which the drive assembly and the disc pack are relatively axially movable in response to the occurrence of wear requiring a change in length of the axial movement.

Thus in accordance with the invention, the drive assembly can be movable bodily towards the disc pack. Alternatively or as well, the drive assembly can be extended in the axial direction, to accommodate the wear. Also, where extension of the drive assembly can be tolerated, advance of the inoperative position of a pressure member in the operating direction due to disk pack wear can be accommodated by a sliding seal, between the member and the unit housing or body.

The invention accordingly provides a clutch or brake unit comprising a body, a pressure member guided by the body for clutch or brake actuation movement, an actuator for causing such pressure member movement, and a backing member supported by the body against which the actuator reacts, the backing member being supported by the body for movement in the actuation direction, and means responsive to wear of the brake or clutch to effect movement of the backing member in the actuation direction.

Thus the drive assembly can comprise a linear actuator of any suitable kind, which can be operated to advance a pressure plate against a disc pack comprising two or more engageable discs to effect engagement of the discs, the actuator reacting against a backing or support member. The backing member is conventionally fixed within the housing of the unit, but in accordance with one aspect of the invention, the backing member is arranged to be advanced in the stroke direction of the pressure member, in response to the detection of a predetermined clearance between the discs of the disc pack.

A variety of mechanisms can be employed to effect this advance of the backing member and thus of the drive assembly as a whole. The backing member can be assembled into the housing of the unit by a screw thread, and can be rotatable to advance it towards the disc pack. Instead, mechanical means permitting forward movement but opposing return can be provided, for example in the form of sprags or ratchet-type mechanisms. Such movements of the backing member can be responsive to movement of the pressure member towards the disc pack beyond a predetermined amount, represented by a predetermined amount of wear of the discs. Instead however the clearance between the discs can be sensed in any suitable way, for example, electrically, by a microswitch or a proximity switch, and the backing member and thus the drive assembly as a whole can be advanced in the in the unit housing by a suitable drive, for example electromechanically, by a screw threaded connection driven by an electric motor energised in response to the sensed wear.

Where the drive assembly is of pneumatic or hydraulic type, the actuating fluid can be supplied to one or more auxiliary chambers from which it is not discharged at the end of a braking or clutch engagement operation to effect wear compensation. An auxiliary chamber can be adjacent the working chamber of the actuator or opposed to it at the opposite end of the disc stack.

The invention will thus be understood to provide a variety of economical and effective means for automatically accommodating wear in clutch or brake units.

BRIEF DESCRIPTION OF DRAWINGS

The invention is further described below, by way of example, with reference to the accompanying drawings, in which:

FIG. 8A is a sectional side view of a brake unit incorporating an eighth wear adjustment mechanism in accordance with the invention;

FIGS. 8B, 8C and 8D are fragmentary views on a larger scale showing details of the adjustment mechanism of FIG. 8; and FIGS. 9A, 9B, 9C & 9D schematically show a seal portion of a wear adjustment mechanism applicable to a brake or clutch unit in accordance with the invention, in respective different positions of use.

DETAILED DESCRIPTION OF DRAWINGS

Figure 1:
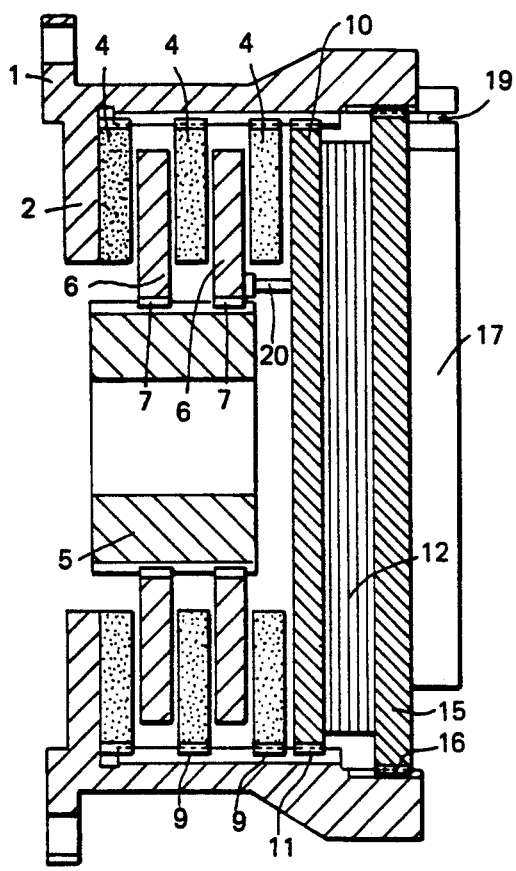
FIG. 1 is a sectional side view of a brake unit incorporating a first wear adjustment mechanism in accordance with the invention.

In the following description, identical or similar parts of the various units illustrated are indicated by the same reference numerals throughout.

The brake unit illustrated in FIG. 1 comprises a housing or body 1 generally in the form of a sleeve, with an inwardly projecting annular flange 2 at its lefthand end, as shown, which supports within the body an annular brake pad or disc 4 of friction material. A hub 5 projects coaxially inwardly of the body from the lefthand end and carries around it two annular brake discs 6 which can slide axially on the hub by means of a splined connection 7. Two further annular discs 4 of friction material are received within the body 1, these further discs 4 having a splined connection 9 at their outer edges to the interior of the body so as to be movable axially within it. Each of the discs 6 is received between two of the friction discs 4. The discs 4 and 6 make up a disc pack which will brake the hub 5 against rotation relative to the body 1 when axially compressed.

Such axial compression is applied by a pressure plate 10 which is again carried by the body for axial movement by way of a splined connection 11. A linear actuator 12 acts between the pressure plate 10 and a backing plate 15 at the righthand end of the unit. The actuator 12 can be hydraulic, pneumatic, electrical or mechanical, and of any suitable conventional construction.

Operation of the actuator 12 will cause movement to the left as shown of the pressure plate 10, so engaging the brake discs 6 with the friction discs 4 and opposing rotational movement of the hub 5 relative to the body 1. The braking effect thus achieved can be released by operation of the actuator 12 to effect withdrawal of the pressure plate 10 from the disc pack.

The friction discs necessarily experience wear in use and the unit of FIG. 1 incorporates a wear adjustment mechanism which operates to compensate for wear automatically, that is, as wear occurs without operator intervention.

The backing plate 15 is thus not fixedly secured to the body 1, but is capable of being rotated to effect movement axially by means of a fine pitch screw thread 16 formed around its outer edge, which is received in a corresponding screw thread in the righthand end of the body. A rotary tension spring device 17 acts between the body 1 and the backing plate 15, tending to rotate the latter in the direction of movement towards the pressure plate 10. A one-way drive device 19 prevents rotation of the backing plate 15 in the other direction.

Rotation of the backing plate 15 in the permitted wear-take up direction is permitted only when wear adjustment is appropriate, by means of clearance sensing pins 20 projecting axially from the pressure plate, to engage the adjacent centre plate 6 on the hub 5.

The adjustment mechanism thus in effect shifts the drive assembly for the brake unit, constituted by the backing and pressure plates and the actuator 12, progressively towards the disc pack to accommodate wear of the discs.

Figure 2A:
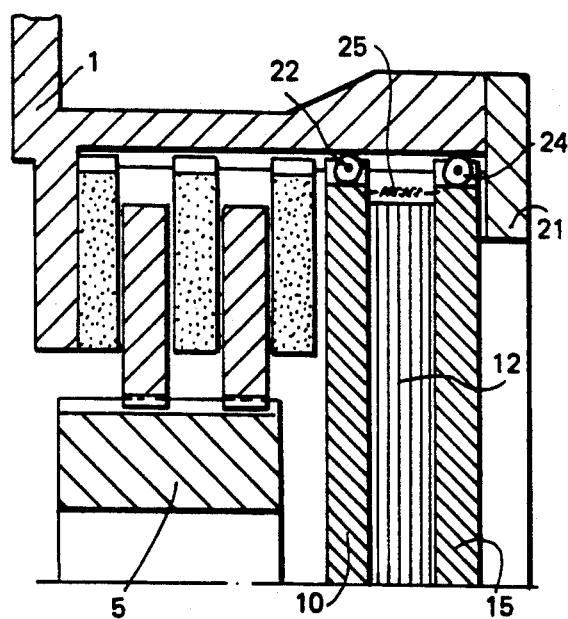
FIG. 2A is a partial view similar to that of FIG. 1 showing a brake unit with a second form of wear adjustment mechanism.
Figure 2B:
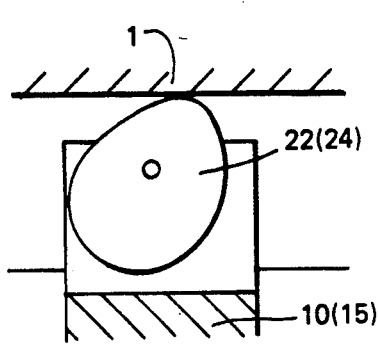
FIG. 2B shows a detail, on a larger scale, of FIG. 2A.

The brake unit shown in FIG. 2 closely resembles that of FIG. 1 but the backing plate 15 is non-rotatably received within the body 1, although it is again axially movable, and an inwardly projecting annular flange 21 at the righthand edge of the body as shown provides an abutment for the backing plate in its initial position, in which no wear has had to be compensated.

The automatic wear adjustment mechanism of the FIG. 2 unit comprises a plurality of oval sprags 22 mounted at positions angularly spaced around the periphery of the pressure plate 10. The sprags 22 are mounted for rotation about axes generally tangential to the pressure plate 10 and are engageable with the inner wall surface of the body 1 to permit movement of the plate to the left but to oppose reverse movement. Sprags 24 of slightly different shape from the sprags 22 are similarly mounted around the backing plate 15. Tension springs 25 space around the actuator 12 act to pull the pressure and backing plates together.

Initially, operation of the actuator 12 moves the pressure plate 10 to the left and the reaction tending to move the backing plate 15 to the right is resisted by the end flange 21. As wear in the disc pack becomes evident, the pressure plate 10 moves further left as is permitted by the sprags 22. On release of actuator pressure, the tension springs 25 pull the backing plate 15 to the left, as the shape of the sprags 24 permits. When the actuator 12 is next operated, the sprags 24 are urged into engagement with the inner wall of the body 1, to provide backing for further leftward movement of the pressure plate 10.

It will be evident that the sprags 22 need engage the body in a wall only to the extent needed to resist the loading of the tension springs 25, whereas the sprags 24 have to resist the force of the actuator 12 as braking pressure is employed.

Figure 3:
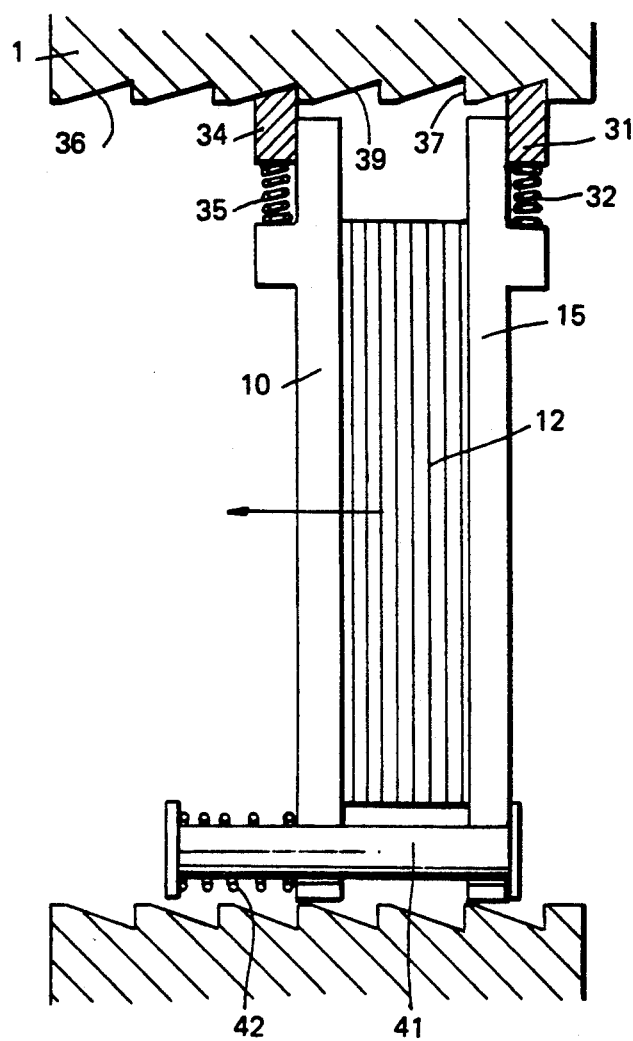
FIGS. 3 and 4 are partial sectional side views of two brake units embodying respectively third and fourth wear adjustment mechanisms according to the invention.

In the brake unit illustrated in FIG. 3, the backing plate 15 is provided at its side remote from the actuator 12 with a plurality of angularly spaced detents 31 which are urged radially outwardly by springs 32. The pressure plate 10 is similarly provided with angularly spaced detents 34 urged radially outwardly by springs 35 at its side remote from the actuator. All the detents 31,34 have free outer end surfaces which are inclined inwardly towards the axis of the device in the direction of brake operation. The inner wall of the body 1 is provided with a series of annular grooves 36 shaped to have a sawtooth-like shape, each groove having a rear wall 37 at right angles to the axis of the unit and a frustoconical ramp portion 39 converging in the same direction as the end surfaces of the detents.

Also spaced angularly around the outer edges of the pressure and backing plates 10,15 are spring mechanisms urging the plates together. Each such mechanism can comprise as shown, a rod 41 extending through aligned apertures in the plates and having end flanges, one of which abuts the backing plate and the other retains a compression spring 42 between it and the pressure plate.

In normal operation, from the position illustrated, the actuator 12 advances the pressure plate 10 with the detents moving inwardly as they ride along the ramp portions 39 of the groove 36 in which they are received. The backing plate 15 cannot of course move rearwardly because of the abutment of its detents 31 against the rear wall of the other groove in which they are received.

When the disc pack has worn to a sufficient extent, operation of the actuator 12 will cause the detents 34 of the pressure plate 10 to ride over into the next groove to the left. On release of the actuator pressure, the pressure plate 10 cannot of course return because of the abutment of its detents against the rear wall 37 of the groove in which its detents are now received. The springs 42 then act to pull the backing plate 15 to the left, until its detents 31 also enter the next groove to the left. The position then is just as illustrated, except that the detents of both the plates extend into grooves 36 adjacent to and to the left of the grooves in which they were originally received.

Figure 4:
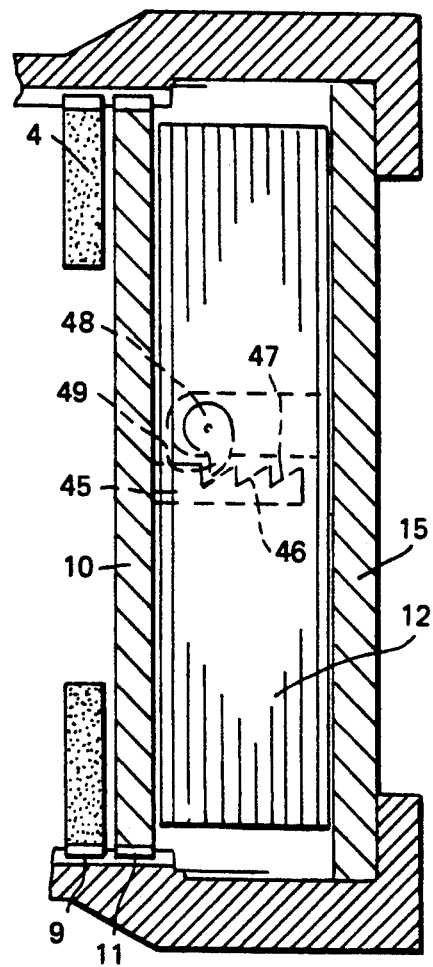

In the brake device of FIG. 4, the backing plate 15 is fixed within the body 1 and the pressure plate 10 carries at least one axially projecting bar 45 provided with ratchet teeth 46 separated by ramp portions 47. A pawl 48 is carried by the backing plate 15 and is spring loaded to engage a pawl tooth 49 with the ratchet teeth 46.

In normal operation, the movement of the pressure plate 10 is accommodated by movement of the pawl tooth 49 along the ramp portion 47 with which it is engaged. When the wear of the disc pack permits it, the ratchet tooth slides over the adjacent tooth 46, and so prevents return of the pressure plate. The actuator 12 here is of a structure permitting this axial extension, for example, it is fluid operated so that the fluid volume required for operation increases with wear.

Figure 5:
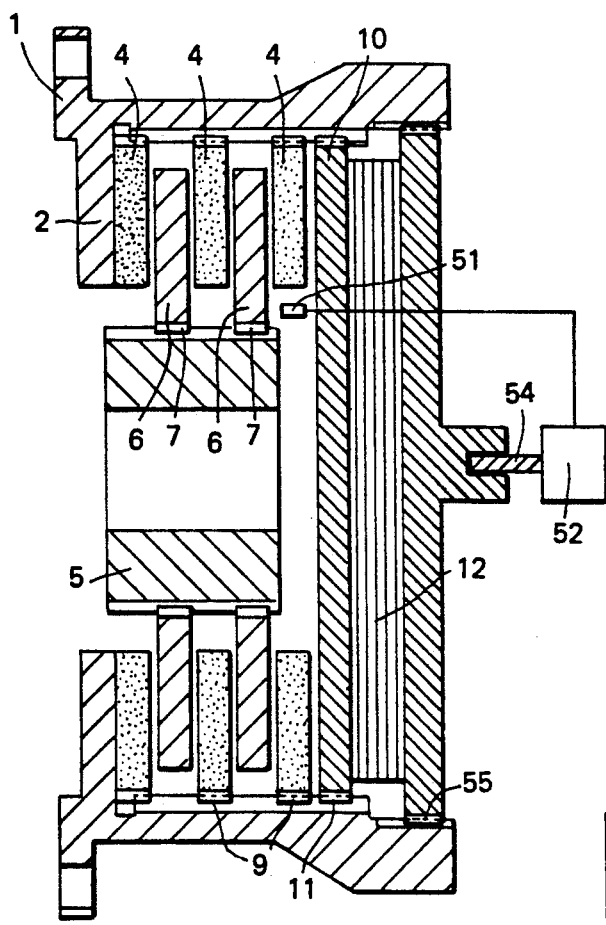
FIG. 5 is a sectional side view of a brake unit embodying a fifth wear adjustment mechanism according to the invention.

In the brake unit of FIG. 5, advance of the backing plate 15 to accommodate wear is effected in response to the sensing of predetermined wear, measured in terms of excess clearance between the discs 4 and 6, by a suitable sensor or sensors, which can be of any appropriate kind, for example, pneumatic, optical, or electrical, for example, as shown, a micro switch or proximity switches 51. Signals from the sensor switch 51 energise a mechanism for moving the backing plate 15 to the left, the mechanism here being constituted by an electric motor 52 rotating a threaded shaft 54 received in a tapped hole in the backing plate. The backing plate is axially movable within the body 1 by means of a splined connection 55.

In a modified form of the unit of FIG. 5, the backing disc has the same screw threaded connection 16 to the body 1 as in the unit of FIG. 1, and the electric motor effects rotation of the disc directly or through a suitable reduction gear. The movement of the backing plate can be effected by other means than an electric motor, for example by hydraulic or pneumatic means.

Figure 6A:
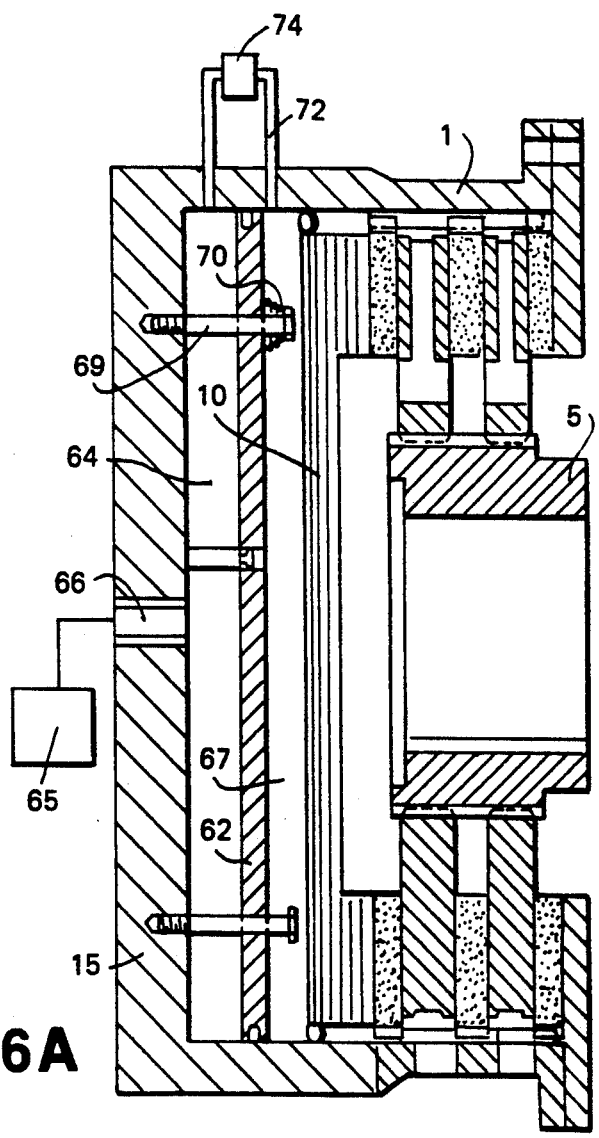
FIG. 6A is a sectional side view of a brake unit incorporating a sixth wear adjustment mechanism according to the invention.

In the brake unit of FIG. 6A, the drive assembly is hydraulic or pneumatic. The backing plate 15 is constituted by an end wall closing the body 1 and forming a cylinder in which a piston 62 is slidably received to define a variable volume main chamber 64 into which pressure fluid can be introduced from a source 65 through a port 66, and from which the fluid can be exhausted or returned to the source. The pressure plate 10 defines with the body wall and the piston 2 an auxiliary variable volume chamber 67 which functions to compensate for wear. At least one bolt 69 received in the plate 15 and extending through an aperture in the piston 62 carries a compression spring 70, between its head and the piston 62 which opposes movement of the piston away from the cylinder closed end and functions as a return spring. The main and auxiliary chambers are connected together through a fluid line 72 in which is placed a non-return valve 74 providing for fluid flow from the main chamber 64 to the auxiliary chamber 67, but not vice versa.

In operation, pressure fluid from the source 65 is introduced into the main chamber 64, so as to tend to move the piston 62 to the right as shown against the spring 70. Because of the fluid connection line 72, an equal pressure will be reached in the auxiliary chamber 67. The pressure plate 10 is consequently moved to the right, to act on the disc pack of the unit. When it is desired to release pressure, the fluid in the main chamber 64 is exhausted or returned to the source and the piston 62 moves to the left under the influence of the spring 70. Because of the nonreturn valve 74, the fluid in the auxiliary chamber 67 cannot escape and the pressure plate 10 moves move with the piston 62.

As wear of the disc pack increases, the pressure plate 10 is required to further and further to the right during its operating stroke, and this movement is accommodated by enlargement of the auxiliary chamber 67.

Figure 6B:
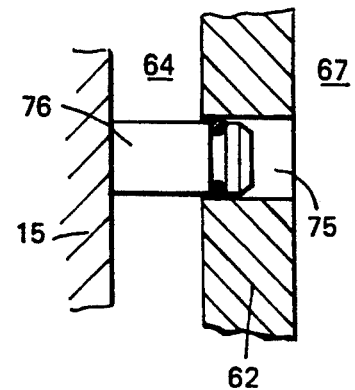
FIGS. 6B, 6C, 6D & 6E show on a larger scale valve arrangements of a modified form of the unit of FIG. 6A.
Figure 6C:
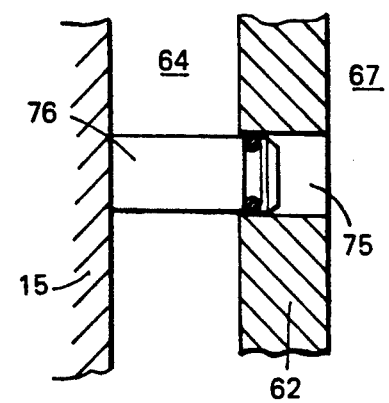

Instead of by the line 72 and valve 74, communication from the main chamber 64 to the auxiliary chamber 67 could be effected by a one-way valve located in an aperture through the piston 62. Alternatively, the piston 62 can be provided with an aperture 75 cooperating with a fixed valve member in the form of a rod 76 extending from the backing plate 15 as shown in FIGS. 6B-6E. In the inoperative position of the brake, the aperture 75 is closed by the rod 76 as shown in FIG. 6B. Movement to the right of the piston 62 in normal operation maintains this situation as shown in FIG. 6C, by sliding of the piston on the rod 76.

Figure 6D:
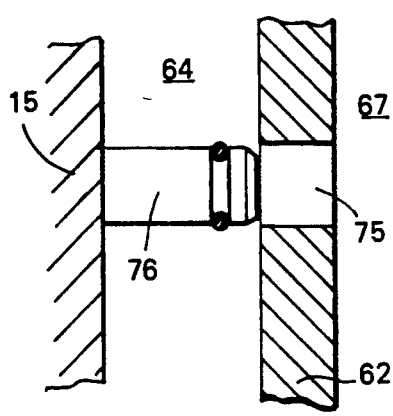
Figure 6E:
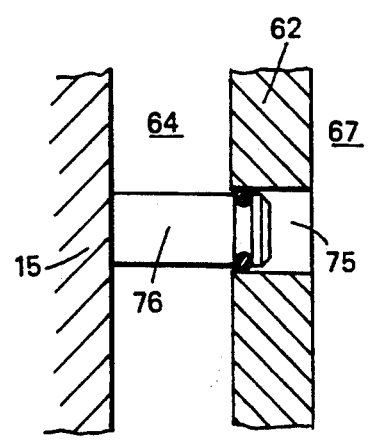

When a predetermined amount of wear has taken place, the piston movement carries it beyond the end of the rod 76 as shown in FIG. 6D, so the fluid in chamber 64 can flow into the chamber 67 to equalise the pressure in these chambers. Release of pressure in the chamber 64 allows return movement of the piston 62 under the effect of the spring 70, until the aperture in the piston is again closed by the rod, as shown in FIG. 6E, after which normal operation can be repeated until wear again allows further pressure fluid to enter the chamber 67.

Figure 7:
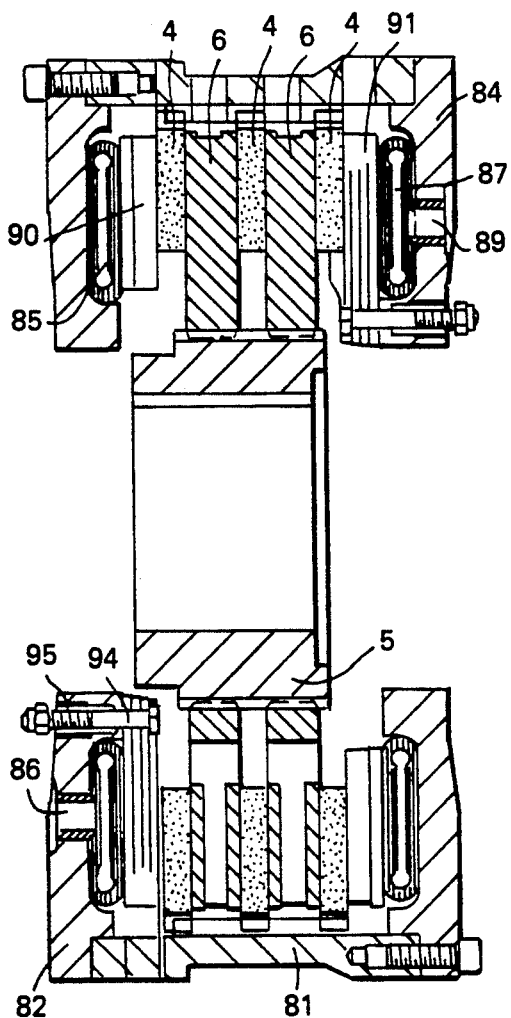
FIG. 7 is a sectional side view of a brake unit incorporating a seventh wear adjustment mechanism in accordance with the invention.

In the brake unit of FIG. 7, the unit body 81 is partially closed at each end by respective annular end walls 82 & 84. The end wall 82 shown at the left of the figure supports within the body a main actuator 85 in the form of an annular pressure fluid operated actuator, to which pressure fluid can be supplied, and from which it can be discharged, through a port 86. Similarly, the end wall 84 supports within the body a similar auxiliary linear actuator 87 for wear adjustment to which pressure fluid can be supplied through a port 89. All the discs 4,6 of the disc pack of the unit are freely slidably movable axially of the body. The two outer friction material discs 4 can be engaged by pressure plates 90 and 91 respectively to subject the disc pack to axial compressive forces from the main and auxiliary actuators. Bolts 94 extending through apertures in the pressure plate 90 and the end wall 82 trap compression springs 95 between the end wall and nuts at the outer ends of the bolts, so that the springs oppose movement of the pressure plate inwardly of the body and function as return springs.

In operation, pressure fluid is supplied to the main actuator 85 and the pressure plate 90 moves to the right as shown to effect braking engagement. At about the end of the movement of the plate 90, fluid pressure is applied also to the auxiliary actuator 87 to provide a counterpressure by way of the pressure plate 91. Release of pressure from the main actuator 85 permits return of the pressure plate 90 under action of the springs 95, and the auxiliary actuator 87 maintains the pressure it has reached. The pressure in the auxiliary actuator is thus boosted if needed at each working stroke to accommodate wear. The fluid flowing to the auxiliary actuator can be by way of a valve as described in connection with the unit of FIG. 6A or could be controlled by a pressure operated mechanism.

The brake unit illustrated in FIG. 8A comprises a pressure plate 10 having a screw thread 91 at its outer edge which is received in corresponding screw thread within the body 1, so that the pressure plate can be advanced to compress the disc pack by rotation about an axis of the unit. The linear actuator, here shown as a fluid pressure operated actuator 92, effects movement of the pressure plate by way of one or more axially directed pins 94 projecting from an actuator output member 95 to be received in respective apertures 96 in the pressure plate 10.

As shown in FIGS. 8B and 8C, the free end of each of the pins 94 has an inclined face 97 terminated by an end surface at right angles to the axis. The pins have a flattened top 99 remote from this flat end surface.

The action of the pins 94 to effect rotation of the pressure plate 10 on movement of the actuator 92 is indicated in FIG. 8D, from which it will appear that a swash-plate like action occurs. The pins could instead locate within indentations in the pressure plate, to stop rotation of the plate in the wrong direction, that is, away from the disc pack.

FIGS. 9A and 9B illustrate in radial cross-section a seal 101 in a fluid pressure operated linear actuator comprising a piston 102 movable within a tubular part 104 of the body of a brake unit or clutch in which the actuator is incorporated. The seal 101 comprises concentric inner and outer sleeve portion 105 and 106, engaged respectively around the piston 102 and within the interior of the body part 104, and an integrally formed web portion 107 connecting the two sleeve portions.

FIGS. 9A and 9B illustrate normal operation, in which the end of the sleeve portions 105,106 facing in the actuating direction abut against flange portions 108 & 109 of the piston and the body part 104 respectively. The normal operating movement of the piston 102 to the right as shown relative to the body part, and its subsequent return, are accommodated by distortion of the web portion 107 of the seal.

When wear of the disc pack reaches a certain amount, normal actuation causes the piston 102 to move beyond the point up to which deformation of the seal is sufficient to retain the inner sleeve portion 105 in contact with the flange 109, the piston slides within the seal so that the position of FIG. 9C is reached. Relaxation of actuator pressure brings about a new inoperative condition, illustrated in FIG. 9D, which resembles that of FIG. 9A, except that the piston 102 is now advanced towards the disc pack relatively to the body, to accommodate the disc pack wear.

Although the invention has been described with reference to a variety of brake or clutch units, it is widely applicable, not merely to the units illustrated. The invention thus can be embodied in a variety of ways other than as specifically described and illustrated. Various modifications are within the true scope and spirit of the invention. The appended claims are, therefore, intended to cover all such modifications.

We claim:
1. A clutch or brake unit comprising:
    a cylinder having a closed end,
    a piston slidably received within said cylinder and defining a main chamber with said closed end thereof,
    a pressure plate slidably received within said cylinder and defining with said piston an auxiliary chamber,
    fluid pressure supply means selectively operable to supply pressure fluid to said main chamber,
    pressure fluid passage means permitting flow of said pressure fluid only into said auxiliary chamber, said auxiliary chamber being sealed against outflow of said pressure fluid therefrom,
    friction members movable together by movement of said pressure plate away from said closed end in response to fluid pressure in said main and auxiliary chambers to effect clutch or brake actuation, and
    return means acting on said piston to effect movement thereof towards said closed end on release of said fluid pressure to end said clutch or brake actuation.
2. The clutch or brake unit of claim 1 wherein said pressure fluid passage means communicates said main and said auxiliary chambers through said piston.
3. A clutch or brake unit comprising:
    a cylinder having a closed end,
    a piston slidably received with said cylinder and defining a main chamber with said closed end thereof,
    a pressure plate slidably received within said cylinder and defining with said piston an auxiliary chamber,
    fluid pressure supply means selectively operable to supply pressure fluid to said main chamber,
    pressure fluid passage means permitting flow of said pressure fluid only into said auxiliary chamber, said auxiliary chamber being sealed against outflow of said pressure fluid therefrom, said pressure fluid passage means communicating said main and said auxiliary chambers externally of said cylinder,
    friction members movable together by movement of said pressure plate away from said closed end in response to fluid pressure in said main and auxiliary chambers to effect clutch or brake actuation, and
    return means acting on said piston to effect movement thereof towards said closed end on release of said fluid pressure to end said clutch or brake actuation.
4. A clutch or brake unit comprising:
    a cylinder having a closed end,
    a piston slidably received within said cylinder and defining a main chamber with said closed end thereof,
    a pressure plate slidably received within said cylinder and defining with said piston an auxiliary chamber, fluid pressure supply means selectively operable to supply pressure fluid to said main chamber, pressure fluid passage means permitting flow of said pressure fluid only into said auxiliary chamber, said auxiliary chamber being sealed against outflow of said pressure fluid therefrom, friction members movable together by movement of said pressure plate away from said closed end in response to fluid pressure in said main and auxiliary chambers to effect clutch or brake actuation, and return means acting on said piston to effect movement thereof towards said closed end on release of said fluid pressure to end said clutch or brake actuation, said return means comprising spring means acting between said piston and the free end of a pin protruding from said cylinder closed end through an aperture in said piston.

5. A clutch or brake unit comprising:
a cylinder having a closed end,
a piston slidably received within said cylinder and defining a main chamber with said closed end thereof,
a pressure plate slidably received within said cylinder and defining with said piston an auxiliary chamber,
fluid pressure supply means selectively operable to supply pressure fluid to said main chamber,
pressure fluid passage means permitting flow of said pressure fluid only into said auxiliary chamber, said auxiliary chamber being sealed against outflow of said pressure fluid therefrom, said pressure fluid passage means comprising a rod extending from said cylinder closed end and sealingly received in an aperture in said piston when said fluid pressure is released, p1 friction members movable together by movement of said pressure plate away from said closed end in response to fluid pressure in said main and auxiliary chambers to effect clutch or brake actuation, and
return means acting on said piston to effect movement thereof towards said closed end on release of said fluid pressure to end said clutch or brake actuation.

* * * * *